US009792745B2

(12) United States Patent
Nishiyama et al.

(10) Patent No.: US 9,792,745 B2
(45) Date of Patent: Oct. 17, 2017

(54) ON-VEHICLE APPARATUS, VEHICLE LOCKING/UNLOCKING SYSTEM, AND METHOD OF CONTROLLING ON-VEHICLE APPARATUS

(71) Applicant: TOYOTA JIDOSHA KABUSHIKI KAISHA, Toyota-shi, Aichi-ken (JP)

(72) Inventors: Shigeki Nishiyama, Nagoya (JP); Tomoyuki Funayama, Toyota (JP); Toru Yoshihara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/293,862

(22) Filed: Oct. 14, 2016

(65) Prior Publication Data
US 2017/0140591 A1 May 18, 2017

(30) Foreign Application Priority Data
Nov. 12, 2015 (JP) ................................. 2015-222473

(51) Int. Cl.
G05B 19/00 (2006.01)
G05B 23/00 (2006.01)
G06F 7/00 (2006.01)
G06F 7/04 (2006.01)
G06K 19/00 (2006.01)
G08B 19/00 (2006.01)
G08C 19/00 (2006.01)
H04B 1/00 (2006.01)
(Continued)

(52) U.S. Cl.
CPC .................... *G07C 9/00309* (2013.01); *G07C 2009/00793* (2013.01)

(58) Field of Classification Search
CPC .................. G07C 9/00309; G07C 2009/00793
See application file for complete search history.

(56) References Cited

U.S. PATENT DOCUMENTS

2005/0162259 A1* 7/2005 Hotta .................. B60C 23/0416
340/426.13
2007/0290796 A1* 12/2007 Teshima .............. B60R 25/2036
340/5.72
(Continued)

FOREIGN PATENT DOCUMENTS

JP 2001-115699 A 4/2001
JP 2005-127050 A 5/2005

*Primary Examiner* — Erin File
(74) *Attorney, Agent, or Firm* — Oliff PLC

(57) ABSTRACT

An on-vehicle apparatus start verifying a first code of a portable apparatus returned from the portable apparatus in response to a first signal from the on-vehicle apparatus unless a battery of the portable apparatus is not exhausted upon detection of a user's operation to unlock/lock a door beside a vehicle; verifies a second code of the portable apparatus returned from the portable apparatus in response to power supply to the portable apparatus through electromagnetic induction caused by a second signal from the on-vehicle apparatus; determines whether the user's operation has been continuously detected if the first code is not returned; ends the verification of the first code if there is no state where the user's operation has been continuously detected; and ends the verification of the first code and starts the verification of the second code if the user's operation has been continuously detected.

8 Claims, 4 Drawing Sheets

(51) Int. Cl.
*H04B 1/38* (2015.01)
*H04B 3/00* (2006.01)
*H04Q 9/00* (2006.01)
*G07C 9/00* (2006.01)

(56) References Cited

U.S. PATENT DOCUMENTS

| | | | | |
|---|---|---|---|---|
| 2010/0211272 A1* | 8/2010 | Ichihara | ................. | B67D 7/145 |
| | | | | 701/49 |
| 2011/0260831 A1* | 10/2011 | Ieda | ..................... | B60R 25/246 |
| | | | | 340/5.64 |
| 2013/0268998 A1* | 10/2013 | Ko | ........................ | H04W 12/06 |
| | | | | 726/3 |
| 2014/0230499 A1* | 8/2014 | Tokoro | .................. | E05B 43/005 |
| | | | | 70/267 |
| 2014/0313011 A1* | 10/2014 | Mimura | ............. | G07C 9/00309 |
| | | | | 340/5.64 |
| 2015/0097652 A1* | 4/2015 | Ishida | .................... | B60R 25/04 |
| | | | | 340/5.61 |
| 2015/0274126 A1* | 10/2015 | Nishiyama | ............ | B60R 25/245 |
| | | | | 701/2 |
| 2016/0036788 A1* | 2/2016 | Conrad | ............. | G07C 9/00571 |
| | | | | 713/168 |
| 2016/0171803 A1* | 6/2016 | Muller | ................. | B60L 11/182 |
| | | | | 340/5.61 |
| 2016/0353305 A1* | 12/2016 | Zakaria | ................ | H04W 24/10 |
| 2017/0074000 A1* | 3/2017 | Banvait | .................. | B60R 25/01 |

* cited by examiner

ON-VEHICLE APPARATUS, VEHICLE LOCKING/UNLOCKING SYSTEM, AND METHOD OF CONTROLLING ON-VEHICLE APPARATUS

BACKGROUND OF THE INVENTION

1. Field of the Invention

The present invention relates to an on-vehicle apparatus, a vehicle locking/unlocking system, and a method of controlling on-vehicle apparatus.

2. Description of the Related Art

In the related art, a vehicle locking/unlocking system where locking and unlocking of doors of a vehicle is implemented through wireless communications between an on-vehicle apparatus included in the vehicle and a portable apparatus that a user can have with him or her is known (for example, see Japanese Laid-Open Patent Application No. 2001-115699). Japanese Laid-Open Patent Application No. 2001-115699 discloses, as a portable apparatus, a remote unit that includes a battery, a first control circuit, and a transponder, and discloses, as an on-vehicle apparatus, a vehicle-side unit that includes a second control circuit.

The remote unit has the first control circuit for determining whether the battery is exhausted. The first control circuit returns an ID code (an identification code of the remote unit) of an RF signal in response to reception of electric waves for starting transmitted from the vehicle-side unit when the battery is not exhausted. On the other hand, the transponder returns a transponder ID code (an identification code of the remote unit) in response to having power supplied through electromagnetic induction caused by electric waves for starting transmitted from the vehicle-side unit when the first control circuit determines that the battery is exhausted. The second control circuit of the vehicle-side unit locks or unlocks doors of a vehicle based on a verification result on the ID code of the RF signal or the transponder ID code.

SUMMARY OF THE INVENTION

According to one aspect, an on-vehicle apparatus included in a vehicle includes at least one processor that is configured to start first verification control to verify a first identification code of a portable apparatus which a user can have with him or her, included in a first response signal returned from the portable apparatus in response to a first request signal, in a first wireless communications authentication mode of transmitting the first request signal and receiving the first response signal, when a user's operation of the user who is beside the vehicle to unlock or lock a door of the vehicle is detected, wherein the portable apparatus cannot return the first response signal when a battery of the portable apparatus is exhausted; carry out second verification control to verify a second identification code of the portable apparatus, included in a second response signal returned from the portable apparatus in response to supply of power to the portable apparatus through electromagnetic induction caused by a second request signal, in a second wireless communications authentication mode of transmitting the second request signal and receiving the second response signal; lock or unlock the door based on a verification result of the first verification control or the second verification control; determine whether the at least one processor has the first response signal returned after the at least one processor transmits the first request signal; determine whether the user's operation has been continuously detected, if the at least one processor determines that at least one processor does not have the first response signal returned; end the first verification control if the at least one processor determines that there is no state where the user's operation has been continuously detected; and end the first verification control and start the second verification control if the at least one processor determines that the user's operation has been continuously detected.

Other objects, features and advantages of the present invention will become more apparent from the following detailed description when read in conjunction with the accompanying drawings.

DETAILED DESCRIPTION OF THE EMBODIMENTS

In the above-mentioned technology disclosed by Japanese Laid-Open Patent Application No. 2001-115699, an on-vehicle apparatus continues transmitting a request signal (i.e., "electric waves for starting") until a portable apparatus returns an identification code even if a likelihood that a user is beside a vehicle is low. Thus, power consumption in on-vehicle apparatus may increase.

An object of embodiments of the present invention is to provide a vehicle locking/unlocking system with which it is possible to prevent an increase of power consumption in an on-vehicle apparatus when a likelihood that a user is beside a vehicle is low.

Below, embodiments of the present invention will be described with reference to the accompanying drawings.

Figure 1:
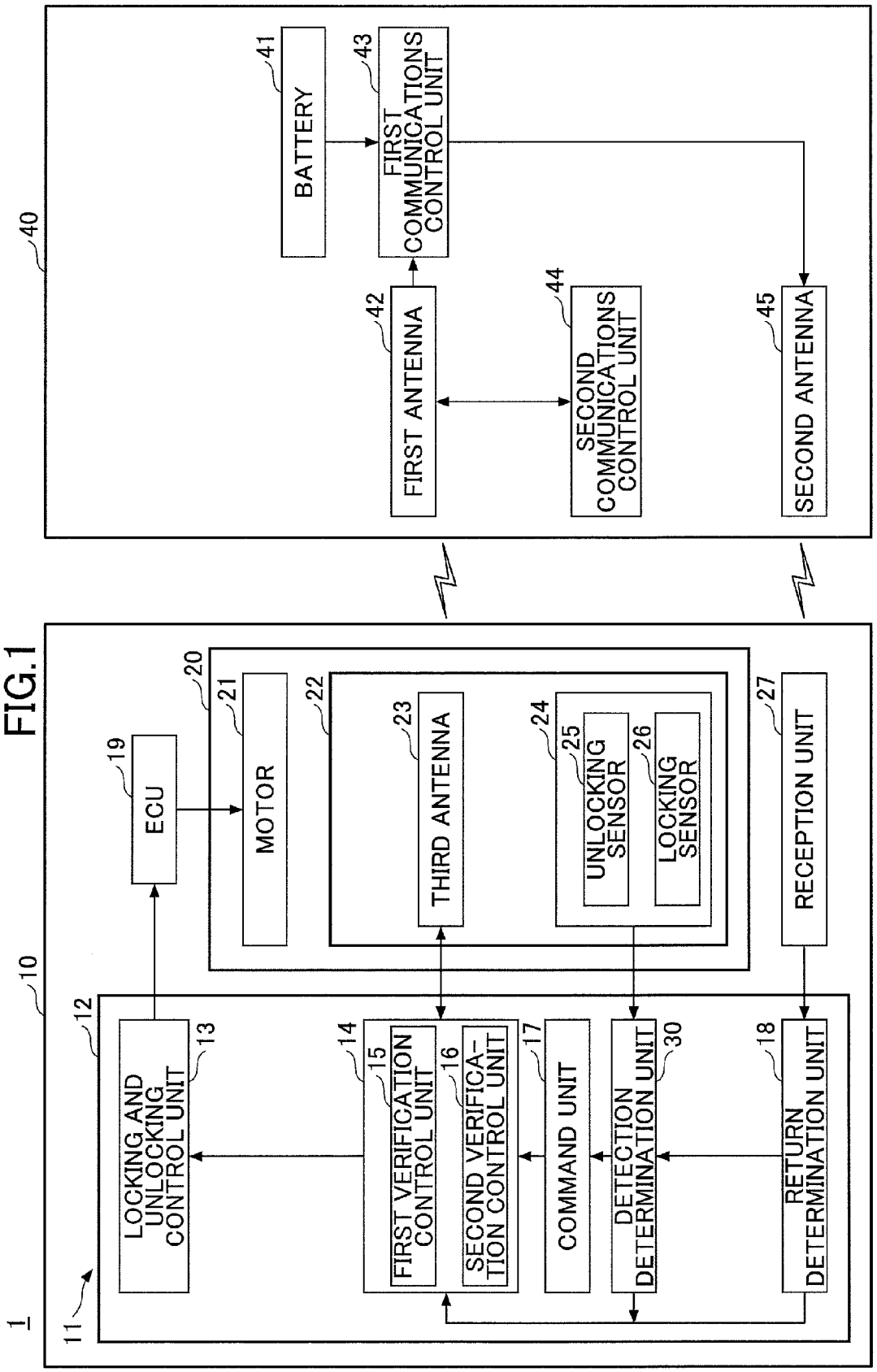
FIG. 1 illustrates one example of a configuration of a vehicle locking/unlocking system.

FIG. 1 illustrates one example of a configuration of a vehicle locking/unlocking system 1. The vehicle locking/unlocking system 1 is one example of a system where, through wireless communications between an on-vehicle apparatus 11 and a portable apparatus 40, doors 20 of a vehicle 10 are locked or unlocked. The on-vehicle apparatus 11 is installed in the vehicle 10, and includes one or more components. The portable apparatus 40 is an apparatus which a user can have with him or her.

The portable apparatus 40 has a battery 41, a first antenna 42, a second antenna 45, a first communications control unit 43, and a second communications control unit 44.

The battery 41 supplies power to the first communications control unit 43, and the first communications control unit 43 is not activated unless power is supplied by the battery 41.

The first antenna 42 is an antenna through which a signal can be transmitted to and received from a third antenna 23 of the on-vehicle apparatus 11 using electric waves of a LF band. "LF" is an abbreviation of low frequency. The first antenna 42 receives a first request signal (hereinafter, referred to as a "first request signal Rq1") transmitted from the third antenna 23 of the on-vehicle apparatus 11, and outputs the received first request signal Rq1 to the first communications control unit 43. Also, the first antenna 42 receives a second request signal (hereinafter, referred to as a "second request signal Rq2") transmitted from the third antenna 23 of the on-vehicle apparatus 11, and outputs the received second request signal Rq2 to the second communications control unit 44.

The second antenna 45 is an antenna dedicated for signal transmission, is capable of transmitting a first response signal (hereinafter, "first response signal Rs1") to the first request signal Rq1 using electric waves of a UHF band (RF signal) for a reception part 27 of the on-vehicle apparatus 11. "UHF" is an abbreviation of ultra-high frequency, and "RF" is an abbreviation of radio frequency.

When the first communications control unit 43 receives the first request signal Rq1 transmitted from the on-vehicle apparatus 11 through the first antenna 42, the first communications control unit 43 returns the first response signal Rs1 that includes a first identification code of the portable apparatus 40 through the second antenna 45. The first communications control unit 43 comes to be not able to return the first response signal Rs1 when the battery 41 is exhausted because the power supply voltage applied to the first communications control unit 43 is excessively reduced.

When power is supplied to the second communications control unit 44 through the first antenna 42 due to electromagnetic induction caused by the second request signal Rq2 transmitted from the on-vehicle apparatus 11, the second communications control unit 44 returns a second response signal (hereinafter, referred to as a "second response signal Rs2") that includes a second identification code of the portable apparatus 40 through the first antenna 42. Even if the battery 41 is exhausted, the second communications control unit 44 can return the second response signal Rs2 because power is supplied to the second communications control unit 44 through electromagnetic induction caused by the second request signal Rq2 at the first antenna 42.

The second communications control unit 44 is, for example, a transponder that has the second identification code used by an immobilizer device of the vehicle 10. For example, a locking and unlocking control device 12 as the immobilizer device has an immobilizer function to use the second identification code to determine whether the vehicle 10 can be driven (for example, whether the engine can be started).

Hereinafter, the first identification code of the portable apparatus 40 included in the first response signal Rs1 will be referred to as an "identification code Cm1", and the second identification code of the portable apparatus 40 included in the second response signal Rs2 will be referred to as an "identification code Cm2". As long as it is possible for the on-vehicle apparatus 11 to identify the portable apparatus 40, the identification code Cm1 can be the same code data as the identification code Cm2, and also, the identification code Cm1 can be code data different from the identification code Cm2.

The on-vehicle apparatus 11 has an operation detection unit 24, the third antenna 23, the reception part 27, the locking and unlocking control device 12, and an ECU 19.

The operation detection unit 24 and the third antenna 23 are installed in a door outside handle 22 installed at an outside of a door, for example. The door outside handle 22 is a touch operation unit on which the user performs a touch operation (such as a gripping or pressing operation) from the outside of the vehicle 10 to unlock or lock the doors 20.

The operation detection unit 24 detects an operation of a user who is beside a door 20 of the vehicle 10 to unlock or lock the doors 20. Hereinafter, an operation of a user who is beside a door 20 of the vehicle 10 to unlock or lock the doors 20 may be simply referred to as a "user's operation". The operation detection unit 24 may detect, for example, a touch operation performed on the door outside handle 22 as a user's operation, or may detect an operation performed on a button installed on a door 20 by a user as a user's operation. Also, the operation detection unit 24 may detect a user's operation using a result of a camera taking a picture, a result of receiving reflected wave in response to irradiated electric waves, or the like.

The operation detection unit 24 has, for example, an unlocking sensor 25 and a locking sensor 26. The unlocking sensor 25 detects a user's operation to unlock the doors 20 (a user's unlocking operation), and the locking sensor 26 detects a user's operation to lock the doors 20 (a user's locking operation). Alternatively, the operation detection unit 24 may detect a user's operation detected in a state where the doors 20 have been locked as a user's unlocking operation, and may detect a user's operation detected in a state where the doors 20 have been unlocked as a user's locking operation.

The third antenna 23 is used to transmit the first request signal Rq1 using electric waves of a LF band. Also, the third antenna 23 is used to transmit the second request signal Rq2 using electric waves of a LF band, and is used to cause electromagnetic induction at the first antenna 42 of the portable apparatus 40 electromagnetically coupled with the third antenna 23.

The reception part 27 receives the first response signal Rs1, and outputs the received result to the locking and unlocking control device 12. The reception part 27 outputs the identification code Cm1 included in the first response signal Rs1. The reception part 27 is, for example, a reception circuit such as a tuner for receiving electric waves of a UHF band.

The locking and unlocking control device 12 includes a verification control unit 14, a locking and unlocking control unit 13, a return determination unit 18, a detection determination unit 30, and a command unit 17. The locking and unlocking control device 12 is, for example, an electronic control unit (ECU) that includes a microcomputer implementing the verification control unit 14, the locking and unlocking control unit 13, the return determination unit 18, the detection determination unit 30, and the command unit 17. The verification control unit 14 has a first verification control unit 15 and a second verification control unit 16.

The first verification control unit 15 carries out first verification control to verify the identification code Cm1 included in the first response signal Rs1 in a first wireless communications authentication mode where the on-vehicle apparatus 11 transmits the first request signal Rq1 through the third antenna 23, and receives the first response signal Rs1 through the reception part 27. The first request signal Rq1 is a signal to request to return the identification code Cm1. The first verification control unit 15 carries out the first verification control to compare the identification code Cm1 with a certain registered code Cr1 previously registered in the vehicle 10 as a true code of the on-vehicle apparatus 11, for example, and outputs the comparison result (i.e., the verification result) to the locking and unlocking control unit 13.

The second verification control unit 16 carries out second verification control to verify the identification code Cm2 included in the second response signal Rs2 in a second wireless communications authentication mode where the on-vehicle apparatus 11 transmits the second request signal Rq2 through the third antenna 23, and receives the second response signal Rs2 through the third antenna 23. The second request signal Rq2 is a signal to request to return the identification code Cm2. The second verification control unit 16 carries out the second verification control to compare the identification code Cm2 with a certain registered code Cr2 previously registered in the vehicle 10 as a true code of the on-vehicle apparatus 11, for example, and outputs the comparison result (i.e., the verification result) to the locking and unlocking control unit 13.

In the second wireless communications authentication mode, because communications through electromagnetic induction between the third antenna 23 and the first antenna 42 are used, the communicatable range is shorter than that in a case where communications are carried out in the first wireless communications authentication mode. Also, when communications are carried out in the first wireless communications authentication mode, communications between the first verification control unit 15 and the third antenna 23 are unidirectional communications, whereas, when communications are carried in the second wireless communications authentication mode, communications between the second verification control unit 16 and the third antenna 23 are bidirectional communications.

The locking and unlocking control unit 13 locks or unlocks the doors 20 based on the verification result of the first verification control of the first verification control unit 15, or the verification result of the second verification control of the second verification control unit 16. The locking and unlocking control unit 13 outputs an unlocking request signal or a locking request signal for the doors 20 to the ECU 19 when, for example, the identification code Cm1 is the same as the registered code Cr1, or the identification code Cm2 is the same as the registered code Cr2. The ECU 19 drives the motor 21 to switch the doors 20 from a locked state to an unlocked state according to the unlocking request signal, and drives the motor 21 to switch the doors 20 from an unlocked state to a locked state according to the locking request signal.

The return determination unit 18 determines whether the first response signal Rs1 is returned after the first request signal Rq1 is transmitted. For example, the return determination unit 18 determines that the first response signal Rs1 is returned if it is detected that the first response signal Rs1 is received by the reception part 27. On the other hand, the return determination unit 18 determines that the first response signal Rs1 is not returned if it is not detected that the first response signal Rs1 is received by the reception part 27.

If the return determination unit 18 determines that the first response signal Rs1 is not returned, the detection determination unit 30 determines whether a user's operation has been being continuously detected by the operation detection unit 24. The command unit 17 commands the verification control unit 14 according to the determined result of the detection determination unit 30.

Figure 2:
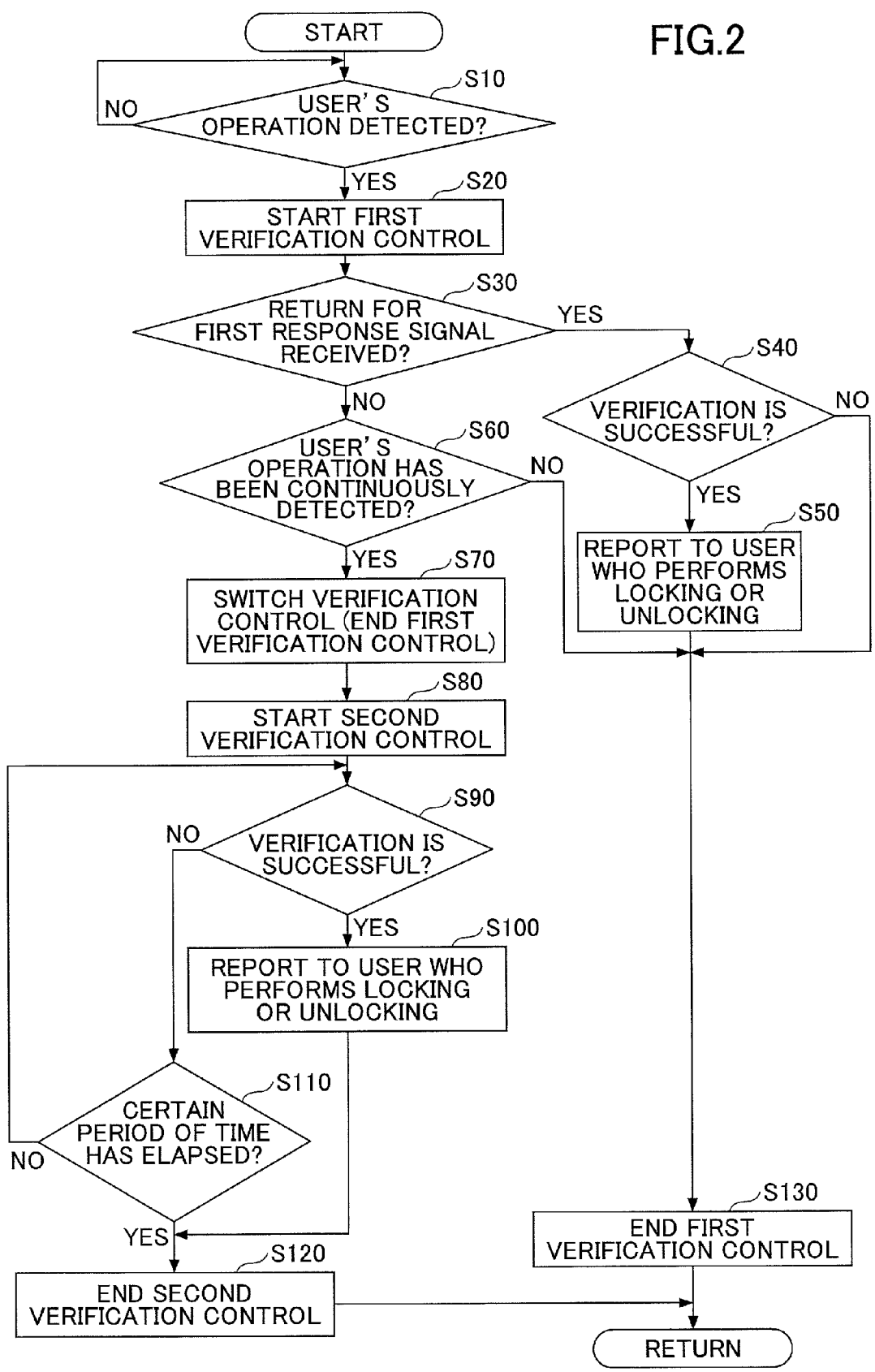
FIG. 2 is a flowchart illustrating one example of operation of the on-vehicle apparatus.
Figure 3:
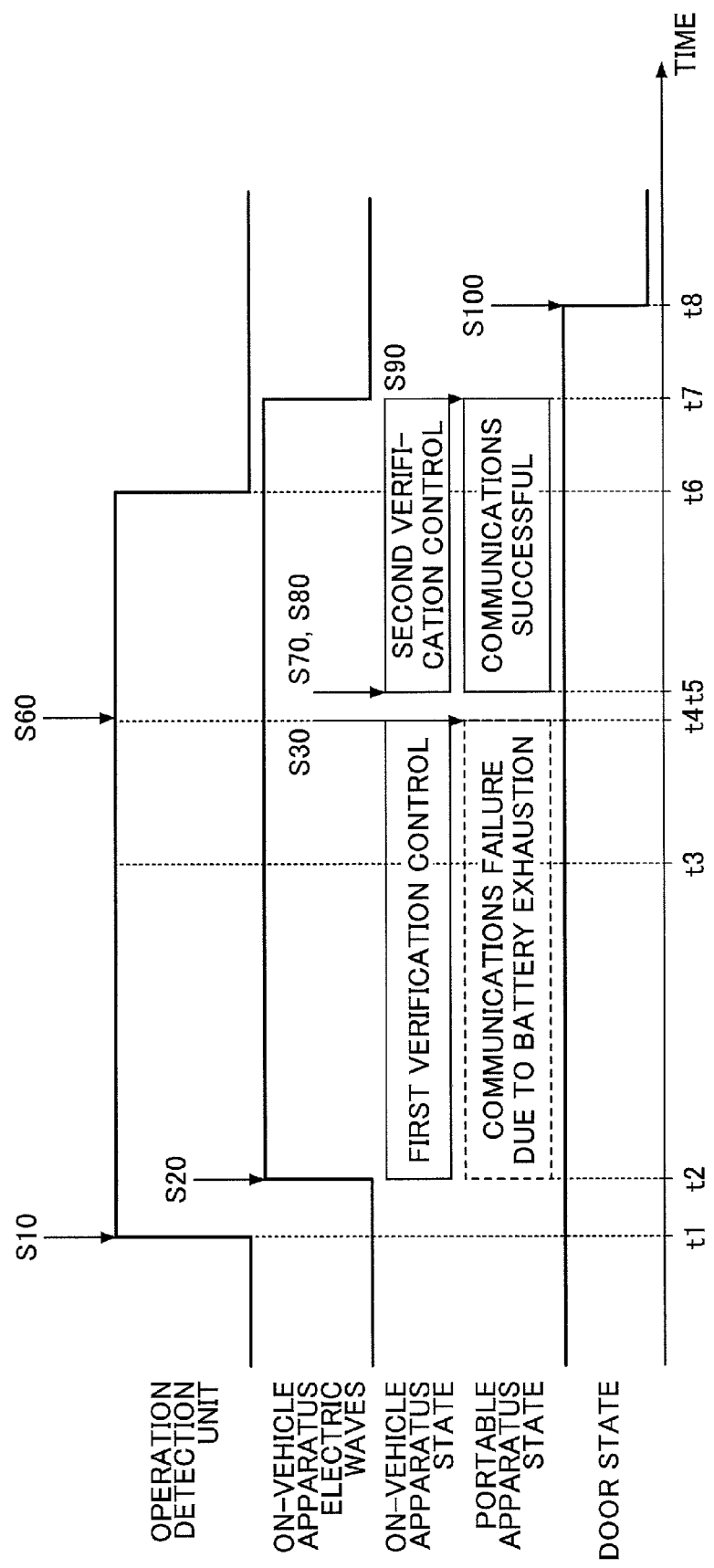
FIG. 3 is a timing chart illustrating one example of operation of the vehicle locking/unlocking system.

FIG. 2 is a flowchart illustrating one example of operation of the locking and unlocking control device 12 of the on-vehicle apparatus 11. FIG. 3 is a timing chart illustrating one example of operation of the vehicle locking/unlocking system 1. With reference to FIG. 3, respective steps illustrated in FIG. 2 will now be described. Note that FIG. 3 illustrates one example where the first verification control is switched into the second verification control.

In step S10, the detection determination unit 30 determines whether a user's unlocking operation or locking operation (that is, a user's operation) is detected by the operation detection unit 24. The operation detection unit 24 outputs, for example, a low level signal when the operation detection unit 24 has not detected a user's operation, and outputs a high level signal when the operation detection unit 24 has detected a user's operation.

If the detection determination unit 30 determines that the operation detection unit 24 has not detected a user's operation, the first verification control unit 15 does not start the first verification control. On the other hand, if the detection determination unit 30 determines that the operation detection unit 24 has detected a user's operation at a timing t1, the first verification control unit 15 starts the first verification control at a timing t2 (step S20).

If the operation detection unit 24 has detected a user's operation, it can be estimated that a likelihood that a user is beside the vehicle 10 is high. Therefore, as a result of the first verification control being started when the user's operation is detected by the operation detection unit 24, transmission of the first request signal Rq1 is started if a likelihood that a user is beside the vehicle 10 is high. That is, because the first request signal Rq1 is not transmitted if a likelihood that a user is beside the vehicle 10 is low, it is possible to prevent an increase of power consumption in the on-vehicle apparatus 11.

In step S30, the return determination unit 18 determines whether the first response signal Rs1 is returned after a start of transmission of the first request signal Rq1. If the return determination unit 18 determines that the first response signal Rs1 is returned at a timing t3, for example, the first verification control unit 15 determines whether the identification code Cm1 included in the first response signal Rs1 is the same as the certain registered code Cr1 (step S40).

If the verification in the first verification control unit 15 is successful (i.e., if the identification code Cm1 included in the first response signal Rs1 is the same as the certain registered code Cr1), the locking and unlocking control unit 13 locks or unlocks the doors 20 by outputting an unlocking request signal or a locking request signal to the ECU 19 (step S50). At this time, the locking and unlocking control unit 13 blinks hazard lamps or sounds a buzzer to allow the user to know that the doors 20 have been locked or unlocked. After step S50, the first verification control unit 15 ends the first verification control (step S130).

On the other hand, if the verification in the first verification control unit 15 has failed (i.e., if the identification code Cm1 included in the first response signal Rs1 is not the same as the certain registered code Cr1), the locking and unlocking control unit 13 does not lock or unlock the doors 20, and the first verification control unit 15 ends the first verification control (step S130).

Also, in step S30, if the first response signal Rs1 is not returned even after retry transmission of the first request signal Rq1, the return determination unit 18 reports to the detection determination unit 30 that the first response signal Rs1 is not returned.

Then, in step S60, the detection determination unit 30 determines whether the user's operation has been continuously detected by the operation detection unit 24. If the user's operation is detected by the operation detection unit 24 at a timing t4 again after the user's operation is detected by the operation detection unit 24 at the timing t1, the detection determination unit 30 determines that the user's operation has been continuously detected by the operation detection unit 24. On the other hand, if the user's operation is not detected by the operation detection unit 24 at the timing t4 after the user's operation is detected by the operation detection unit 24 at the timing t1, the detection determination unit 30 determines that there is no state where the user's operation has been continuously detected by the operation detection unit 24.

If the return determination unit 18 determines that the first response signal Rs1 is not returned, and the detection determination unit 30 determines that there is no state where the user's operation has been continuously detected by the operation detection unit 24, the command unit 17 commands the first verification control unit 15 to end the first verification control (step S130).

If the return determination unit 18 determines that the first response signal Rs1 is not returned, and the detection determination unit 30 determines that there is no state where the user's operation has been continuously detected by the operation detection unit 24, it can be estimated that a likelihood that the detection of the user's operation at the first timing t1 is erroneous is high, and a likelihood that the user is beside the vehicle 10 is low. Therefore, if the return determination unit 18 determines that the first response signal Rs1 is not returned, and the detection determination unit 30 determines that there is no state where the user's operation has been continuously detected by the operation detection unit 24, the first verification control is ended. Thereby, if a likelihood that the user is beside the vehicle is low, the transmission of the first request signal Rq1 is stopped, and thus, it is possible to prevent an increase of power consumption in the on-vehicle apparatus 11.

On the other hand, if the return determination unit 18 determines that the first response signal Rs1 is not returned, and the detection determination unit 30 determines that the user's operation has been continuously detected by the operation detection unit 24, the command unit 17 commands the first verification control unit 15 to end the first verification control to switch the first verification control into the second verification control (step S70). Then, the command unit 17 commands the second verification control unit 16 to start the second verification control at a timing t5 (step S80).

If the return determination unit 18 determines that the first response signal Rs1 is not returned, and the detection determination unit 30 determines that the user's operation has been continuously detected by the operation detection unit 24, it can be estimated that a likelihood that the user is beside the vehicle 10 is higher. Therefore, if the return determination unit 18 determines that the first response signal Rs1 is not returned, and the detection determination unit 30 determines that the user's operation has been continuously detected by the operation detection unit 24, the first verification control is ended and the second verification control is started. Thereby, if a likelihood that the user is beside the vehicle 10 is high, transmission of the second request signal Rq2 is started. That is, if a likelihood that the user is beside the vehicle 10 is low, the second request signal Rq2 is not transmitted, and therefore, it is possible to prevent an increase of power consumption in the on-vehicle apparatus 11.

In step S90, the second verification control unit 16 determines whether the identification code Cm2 included in the second response signal Rs2 received as a response to the second request signal Rq2, if any, is the same as the certain registered code Cr2. If the verification in step S90 is successful, i.e., if the identification code Cm2 included in the second response signal Rs2 received as a response to the second request signal Rq2 is the same as the certain registered code Cr2, it can be estimated that the reason why the first response signal Rs1 is not returned in step S30 is that the battery 41 of the portable apparatus 40 is exhausted. Note that, if the state where the user's operation has been detected is changed into a state where the user's operation has not been detected (timing t6) before the verification in step S90, the determination result in step S90 is not influenced.

If the verification in the second verification control unit 16 is successful (i.e., if the identification code Cm2 included in the second response signal Rs2 is the same as the certain registered code Cr2) at a timing t7, the locking and unlocking control unit 13 locks or unlocks the doors 20 at a timing t8 by outputting an unlocking request signal or a locking request signal to the ECU 19 (step S100). At this time, the locking and unlocking control unit 13 blinks the hazard lamps or sounds the buzzer to allow the user to know that the doors 20 have been locked or unlocked. After step S100, the second verification control unit 16 ends the second verification control (step S120).

On the other hand, if the verification in step S90 has failed (i.e., if the identification code Cm2 included in the second response signal Rs2 is not the same as the certain registered code Cr2, or the second response signal Rs2 is not received), the second verification control unit 16 determines whether a certain period of time (for example, 10 seconds) has elapsed since the second verification control was started (step S110). If the certain period of time has not been elapsed yet, the second verification control unit 16 repeats the verification in step S90. If the verification in step S90 is still failing until the certain period of time has elapsed since the second verification control was started, the second verification control unit 16 ends the second verification control (step S120).

If the verification in step S90 is still failing until the certain period of time has elapsed since the second verification control was started, it can be estimated that the user does not have the portable apparatus 40 with him or her, or the user does not have an authorized portable apparatus 40. Therefore, if the verification in step S90 is still failing until the certain period of time has elapsed since the second verification control was started, the second verification control is ended. Thus, if the user does not have the portable apparatus 40 with him or her, or the user does not have an authorized portable apparatus 40, the transmission of the second request signal Rq2 is stopped. As a result of the transmission of the second request signal Rq2 being stopped, it is possible to prevent an increase of power consumption in the on-vehicle apparatus 11 if the user does not have the portable apparatus 40 with him or her, or the user does not have an authorized portable apparatus 40.

Figure 4:
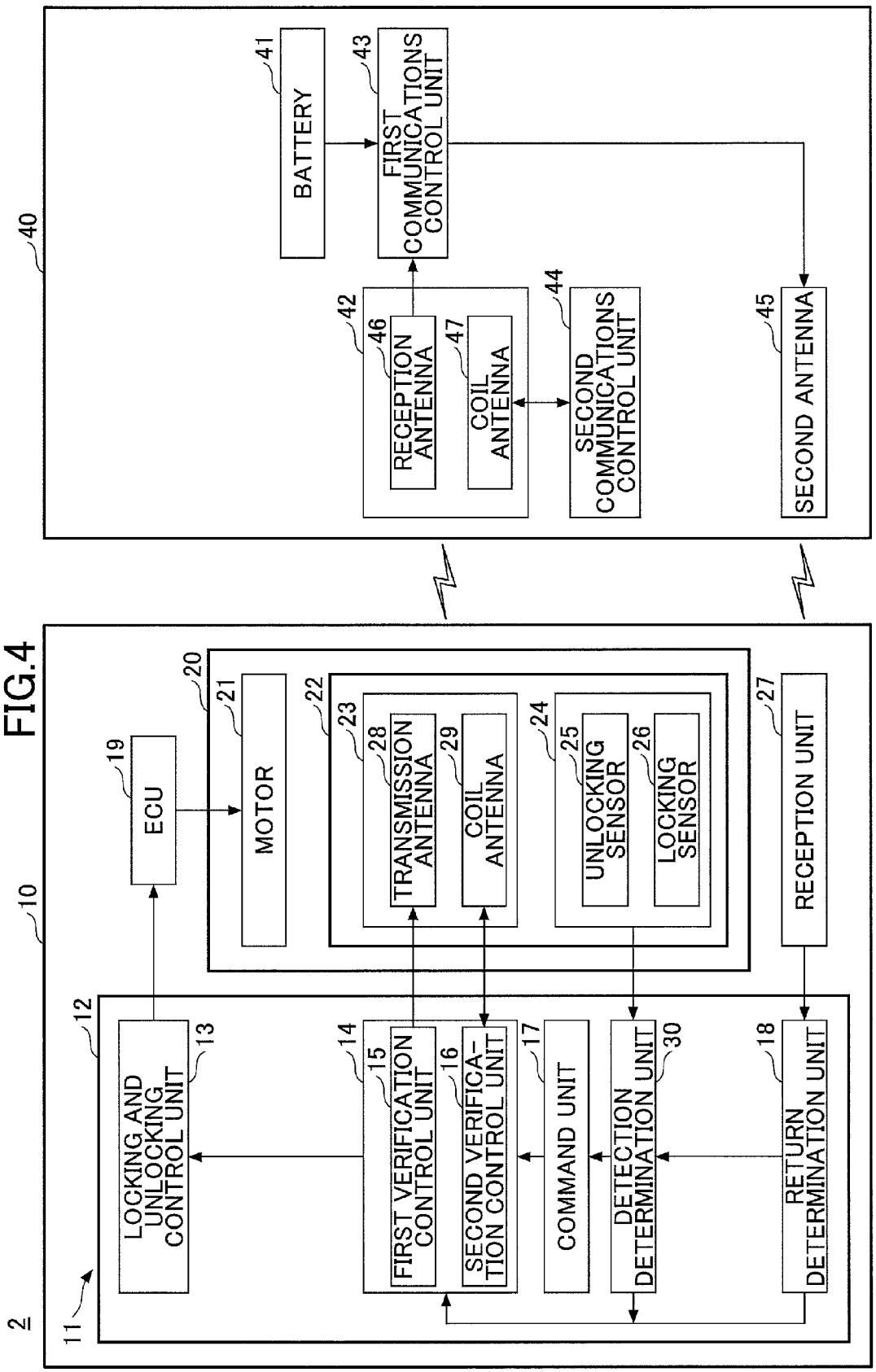
FIG. 4 illustrates another example of a configuration of a vehicle locking/unlocking system.

FIG. 4 illustrates another example of a configuration of a vehicle locking/unlocking system 2. Description of elements the same as or similar to those in FIG. 1 will be omitted. In the vehicle locking/unlocking system 1 of FIG. 1, the antenna for transmitting the first request signal Rq1 is the same as the antenna for causing electromagnetic induction in the on-vehicle apparatus 10. Also, the antenna for receiving the first request signal Rq1 is the same as the antenna at which electromagnetic induction is caused in the portable apparatus 40. In contrast, in the vehicle locking/unlocking system 2 of FIG. 4, an antenna for transmitting the first request signal Rq1 is different from an antenna for causing electromagnetic induction in the on-vehicle apparatus 10. Also, an antenna for receiving the first request signal Rq1 is different from an antenna at which electromagnetic induction is caused in the portable apparatus 40.

In the vehicle locking/unlocking system 2, the third antenna 23 includes a transmission antenna 28 for transmitting the first request signal Rq1, and a coil antenna 29 for causing electromagnetic induction. Also, the first antenna 42 includes a reception antenna 46 for receiving the first request signal Rq1, and a coil antenna 47 at which electromagnetic induction is caused.

Thus, also in the vehicle locking/unlocking system 2, in the same way as the vehicle locking/unlocking system 1, it is possible to prevent an increase of power consumption in the on-vehicle apparatus 11 when a likelihood that a user is beside the vehicle 10 is low.

According to the above-described embodiments of the present invention, if a user's operation is detected by the operation detection unit, it can be estimated that a likelihood that the user is beside the vehicle is high. Therefore, if the operation detection unit detects a user's operation, the first verification control is started. Thus, if a likelihood that a user is beside the vehicle is high, transmission of the first request signal is started. That is, if a likelihood that a user is beside the vehicle is low, the first request signal is not transmitted, and therefore, it is possible to prevent an increase of power consumption in the on-vehicle apparatus.

Also, if the detection determination unit determines that there is no state where a user's operation has been continuously detected by the operation detection unit, a likelihood that a first detection of the user's operation may be erroneous is high, and it can be estimated that a likelihood that a user is beside the vehicle is low. Therefore, if the detection determination unit determines that there is no state where a user's operation has been continuously detected by the operation detection unit, the first verification control is ended. Thus, because transmission of the first request signal is stopped if a likelihood that the user is beside the vehicle is low, it is possible to prevent an increase of power consumption in the on-vehicle apparatus.

Also, if the detection determination unit determines that a user's operation has been continuously detected by the operation detection unit, it can be estimated that a likelihood that a user is beside the vehicle is high. Therefore, if the detection determination unit determines that a user's operation has been continuously detected by the operation detection unit, the first verification control is ended and the second verification control is started. Thereby, if a likelihood that a user is beside the vehicle is high, transmission of the second request signal is started. In other words, if a likelihood that a user is beside the vehicle is low, the second request signal is not transmitted, and therefore, it is possible to prevent an increase of power consumption in the on-vehicle apparatus.

Therefore, according to the embodiments of the present invention, it is possible to prevent an increase of power consumption in an on-vehicle apparatus, if a likelihood that a user is beside a vehicle is low.

The on-vehicle apparatuses, the vehicle locking/unlocking systems, and the methods of controlling on-vehicle apparatuses have been described in the embodiments. However, the present invention is not limited to these embodiments. Various modifications and/or improvements such as combinations with part of or all of another embodiment(s), a replacement(s) with part of another embodiment(s), and so forth, can be made within the scope of the present invention.

The present application is based on and claims the benefit of priority of Japanese Priority Application No. 2015-222473, filed on Nov. 12, 2015, the entire contents of which are hereby incorporated herein by reference.

What is claimed is:

1. An on-vehicle apparatus to be used in a vehicle, the on-vehicle apparatus comprising:
at least one processor configured to:
in response to detecting a user operation to lock/unlock the vehicle door(s), start first verification control including:
transmitting, to a portable apparatus which a user can carry with him or her, a first request signal,
upon receipt of a response to the first request signal:
determining whether a first identification code included in
the received response to the first request signal corresponds to a first predetermined type of identification code, which is a type of identification code that can only be returned by the portable apparatus when a battery of the portable apparatus is not exhausted, and
if the first identification code included in the received response to the first request signal corresponds to the first predetermined type of identification code, determining that the first verification control was successful and transmitting a lock/unlock request to lock/unlock the vehicle door(s), and
if a response to the first request signal has not been received within a first certain amount of time elapsing after the start of the first verification control, and the user operation to lock/unlock the vehicle door(s) has been continuously detected during a second certain amount of time, end the first verification control and start second verification control including:
transmitting, to the portable apparatus, a second request signal, and
upon receipt of a response to the second request signal:
determining whether a second identification code included in the received response to the second request signal corresponds to a second predetermined type of identification code, which is an identification code received in response to the second request signal by the portable apparatus in a state that the portable apparatus is being supplied power through electromagnetic induction caused by the second request signal, and if the second identification code included in the received response to the second request signal corresponds to the second predetermined type of identification code, determining that the second verification control was successful and transmitting the lock/unlock request to lock/unlock the vehicle door(s).

2. The on-vehicle apparatus according to claim 1, wherein the at least one processor is further configured to end the second verification control if the second verification control is not yet successful and a third certain amount of time has elapsed since the second verification control started.

3. The on-vehicle apparatus according to claim 1, wherein the user operation is a non-remote control physical user operation for locking/unlocking the vehicle door.

4. The on-vehicle apparatus according to claim 1, wherein the first verification control is started, after detection of a predetermined user operation.

5. A vehicle locking/unlocking system comprising:
a portable apparatus that a user can carry with him or her, the portable apparatus
including:
a battery,
a first communications control circuit configured to transmit a first
response in response to receiving a first request signal, the first response including a first identification code, the first communications control circuit being unable to return the first response when the battery is exhausted, and
a second communications control circuit configured to transmit a second response in response to receiving a second request signal, the second response including a second identification code, which is an identification code transmitted in response to receiving the second request signal by the portable apparatus in a state that the portable apparatus is being supplied with power through electromagnetic induction caused by the second request signal; and an on-vehicle apparatus to be used in a vehicle, the on-vehicle apparatus including at least one processor configured to:
in response to detecting a user operation to lock/unlock the vehicle door(s), start first verification control including:
transmitting, to the portable apparatus, the first request signal, upon receipt of a response to the first request signal:
determining whether a first identification code included in the received response to the first request signal corresponds to a first predetermined type of identification code, which is a type of identification code that can only be returned by the portable apparatus when the battery of the portable apparatus is not exhausted, and
if the first identification code included in the received response to the first request signal corresponds to the first predetermined type of identification code, determining that the first verification control was successful and transmitting a lock/unlock request to lock/unlock the vehicle door(s), and
if a response to the first request signal has not been received within a first certain amount of time elapsing after the start of the first verification control, and the user operation to lock/unlock the vehicle door(s) has been continuously detected during a second certain amount of time, end the first verification control and start second verification control including:
and
transmitting, to the portable apparatus, the second request signal,
upon receipt of a response to the second request signal:
determining whether a second identification code included in the received response to the second request signal corresponds to a second predetermined type of identification code, which is an identification code received in response to the second request signal by the portable apparatus in a state that the portable apparatus is being supplied power through electromagnetic induction caused by the second request signal, and
if the second identification code included in the received response to the second request signal corresponds to the second predetermined type of identification code, determining that the second verification control was successful and transmitting the lock/unlock request to lock/unlock the vehicle door(s).

6. The vehicle locking/unlocking system according to claim 5, wherein the at least one processor is further configured to end the second verification control if the second verification control is not yet successful and a third certain amount of time has elapsed since the second verification control started.

7. A method comprising:
in response to detecting a user operation to lock/unlock the vehicle door(s) by at least one processor, starting, by the at least one processor, first verification control including:
transmitting, to a portable apparatus which a user can carry with him or her, a first request signal,
upon receipt of a response to the first request signal:
determining whether a first identification code included in the received response to the first request signal corresponds to a first predetermined type of identification code, which is a type of identification code that can only be returned by the portable apparatus when a battery of the portable apparatus is not exhausted, and
if the first identification code included in the received response to the first request signal corresponds to the first predetermined type of identification code, determining that the first verification control was successful and transmitting a lock/unlock request to lock/unlock the vehicle door(s), and
if a response to the first request signal has not been received within a first certain amount of time elapsing after the start of the first verification control, and the user operation to lock/unlock the vehicle door(s) has been continuously detected during a second certain amount of time, ending, by the at least one processor, the first verification control and starting, by the at least one processor, second verification control including:
transmitting, to the portable apparatus, a second request signal, and upon receipt of a response to the second request signal:
determining whether a second identification code included in the received response to the second request signal corresponds to a second predetermined type of identification code, which is an identification code received in response to the second request signal by the portable apparatus in a state that the portable apparatus is being supplied power through electromagnetic induction caused by the second request signal, and
if the second identification code included in the received response to the second request signal corresponds to the second predetermined type of identification code, determining that the second verification control was successful and transmitting the lock/unlock request to lock/unlock the vehicle door(s).

8. The method according to claim 7, further comprising:
ending, by the at least one processor, the second verification control if the verification of the second identification code has not become successful by the time a third certain amount of time has elapsed since the at least one processor started the second verification control.

* * * * *